Oct. 5, 1954
O. M. RAES
2,690,820
VARIABLE DENSITY BRAKE LINING
Filed Jan. 21, 1950
2 Sheets-Sheet 1
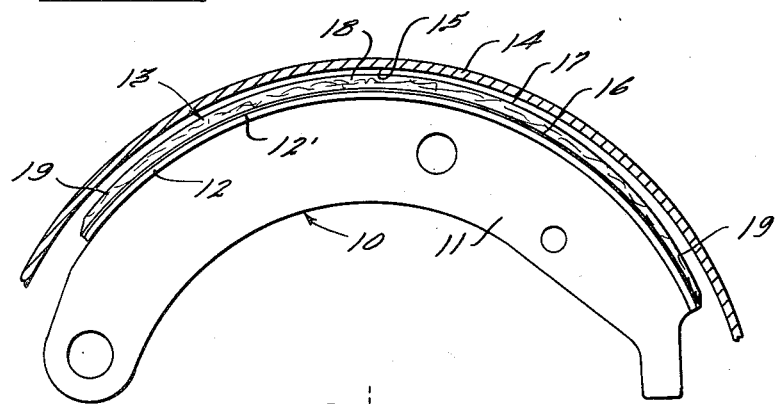
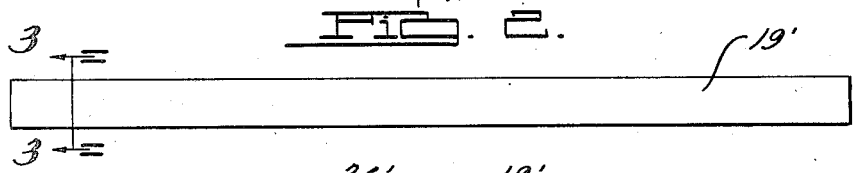
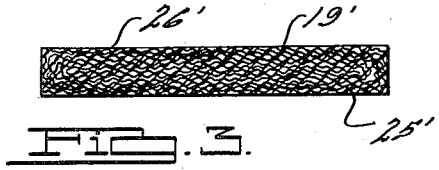
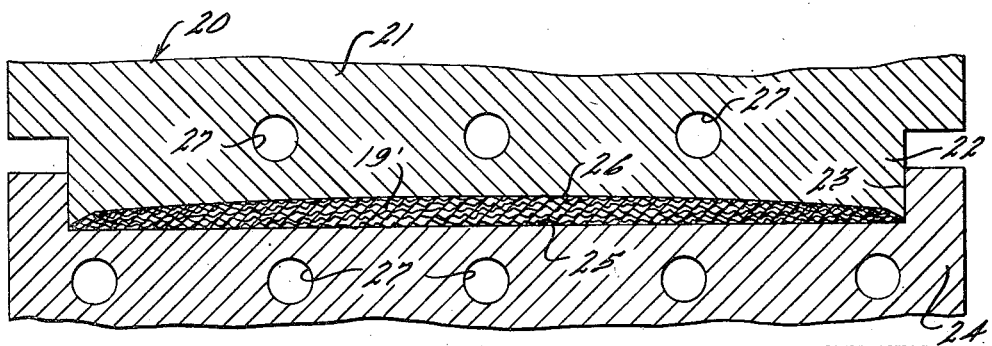
INVENTOR.
Oscar M. Raes.
BY
Harness and Harris
ATTORNEYS.

Oct. 5, 1954 O. M. RAES 2,690,820
VARIABLE DENSITY BRAKE LINING
Filed Jan. 21, 1950 2 Sheets-Sheet 2

INVENTOR.
Oscar M. Raes.
BY Harness and Harris
ATTORNEYS.

Patented Oct. 5, 1954

2,690,820

UNITED STATES PATENT OFFICE 2,690,820

VARIABLE DENSITY BRAKE LINING

Oscar M. Raes, Utica, Mich., assignor to Chrysler Corporation, Highland Park, Mich., a corporation of Delaware Application January 21, 1950, Serial No. 139,880

4 Claims. (Cl. 188—250)

My invention relates to vehicle brakes and more particularly to a new and novel brake lining.

In the past, vehicles employing conventional hydraulic brake construction including a brake shoe and a brake drum with a brake lining interposed therebetween have been troubled with what is commonly known as brake squeal. It is a principal object of my invention to provide a motor vehicle with an improved brake structure which materially reduces and often entirely eliminates brake squeal.

A further object of my invention is to provide a novel type of brake lining having opposite end portions of relatively higher density than the center portions thereof.

Still a further object of my invention is to provide a brake lining having end portions thinner in cross section than the center portions thereof.

Other objects of my invention are to provide an improved brake lining which may be readily applied to many conventional brake systems; to provide a lining of the type which may be conveniently assembled with a brake shoe, and to provide a lining which may be economically and easily manufactured.

Other objects and advantages will become more apparent from the following description of one embodiment of my invention, reference being had to the accompanying drawings in which:

Fig. 1 is an elevational view of a brake shoe and drum illustrating the application of my improved lining thereto.

Fig. 2 is a plan view of a molded strip of brake lining prior to being formed in a first molding operation.

Fig. 3 is a transverse sectional view of the molded lining strip taken on the line 3—3 of Fig. 2.

Fig. 4 is a sectional view of a heated mold illustrating the first molding operation of forming my improved brake lining.

Figure 5:
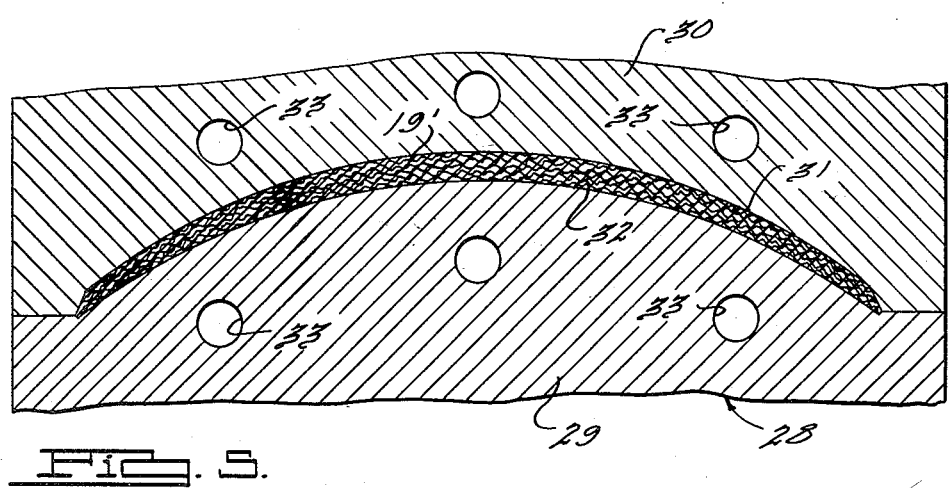
Fig. 5 is a sectional view of a heated mold illustrating the second molding operation of finally contouring my improved lining.

In Fig. 1 I have shown a brake shoe, generally designated by the numeral 10, of the type commonly used in motor vehicle hydraulic brake systems including a web portion 11 which is integrally secured to a rim 12. The rim and web portion in transverse cross section are perpendicular to each other and the outer surface of the rim 12 is arcuate in contour and such surface in longitudinal cross section is generated about a center indicated at A. The rim 12 has bonded thereto my improved brake lining generally designated by the numeral 13 having concave and convex surfaces 16 and 17, respectively, and a uniform width. The brake lining 13 is adapted to be urged against a brake drum 14 when the brake shoe 10 is subjected to hydraulic pressure. The inner surface 15 of the brake drum 14 is concentric with the outer surface 12' of the rim 12 so that in longitudinal cross section the surface 12' is also generated about the center A. The concave surface 16 of the brake lining 13 is similarly concentric with the surfaces 12' and 15 of the rim 12 and brake drum 14, respectively, and is bonded or in some other similar fashion securely connected to the surface 12' of the rim 12. The convex surface 17 of the lining 13 in longitudinal cross section is generated about the center B which is disposed between the center A and the lining. By generating the surface 17 about the center B, the transverse sectional thickness of the lining is greater at the center portion 18 of the lining and gradually becomes less towards the opposite end portions 19 which are the thinnest portions of the brake lining so as to provide a brake lining of substantially crescent shaped side elevational configuration. It may be readily seen, therefore, that the center portion 18 of the lining 13 will engage the brake drum before any other portions of the lining. It has been found that by tapering the brake linings in such a manner as to reduce the thickness of the end portions and by increasing the density of the lining end portions with respect to the lining central portions, break squeal is materially reduced. In accordance with my invention, I have not only tapered the portions of the brake lining but I have also provided a brake lining having end portions of greater density than the center portion thereof. The brake lining 13 may be made in such a manner as hereafter set forth. By utilizing a brake lining having differing densities of the same material, different coefficients of frictions of the brake lining relative to the brake drum may be obtained. That is to say, the end portions 19 have a smaller coefficient of friction than the center portion 18, the intermediate portions between the end portions and the center portion having varying coefficients of friction in accordance with their relative thicknesses so that as the thickness becomes greater, so does the coefficient of friction.

Brake squeal is often caused by the application of the entire braking surface of a conventional brake lining to the brake drum at the same instant. Also, brake squeal is often amplified due to the fact that in conventional linings where the coefficient of friction of the lining relative to the drum is uniform throughout its length, the vibrations causing the brake squeal are uniform. In accordance with my invention wherein the coefficient of friction of the different portions of the brake lining are different the relative vibrations of the brake lining will not cause or will materially reduce the amplified vibrations normally found in the lining of uniform coefficient of friction. While it is not understood with certainty just why the squeal is reduced, it is found that the portions of the lining of different density and/or coefficient of friction contribute to squeal reduction and it is thought that this is produced by the creation of different vibration frequencies which conflict with each other and prevent amplification of the vibrations.

In Fig. 2 I have shown a strip or blank of molded brake lining material 19'. This material is preferably woven from substances such as asbestos and cotton treated with friction modifiers such as powdered graphite, lead or zinc compounds, and it includes a binder such as natural or synthetic resins which cure when subjected to heat and pressure. The lining material 19' may or may not have wire backing therein depending on the contemplated use of the brake lining. The material 19' as shown in Figs. 2 and 3 is in a molded state and after being cut to a predetermined length, it is pressed within a mold, generally designated by the numeral 20. The mold comprises a male member 21 which has a forming portion 22 which fits into a recess 23 in a female member 24. The recess 23 is in the form of a longitudinally extending cavity having a horizontal bottom face 25 which receives one longitudinal surface 25' of the brake lining material 19'. The forming portion 22 is provided with a partially arced lower surface 26 which engages the top surface 26' of the brake lining material 19'. When the brake lining material is disposed within the mold, it is not in a flowable state and since the surface 26 of the forming portion 22 is slightly arced in a concave fashion, greater pressure is applied to the end portions of the lining material than at the center portions thereby compressing the end portions to a smaller transverse thickness and a greater density. In this manner, the brake lining which is being made is supplied with unequal pressures for effecting the varying densities as heretofore set forth and the end portions of the lining material 19' are chamfered in the mold by the forming portion 22 to eliminate this step after the brake lining has been formed. The mold 20 is provided with a plurality of heating passages 27 which may contain heating medium such as steam, electric heating elements or heating coils for the purpose of heating the mold to partially cure the lining material during this molding operation. It is not absolutely necessary to so cure the lining material during its first molding operation but it has been found expedient to do so in order to expedite the manufacture of the lining. The compression applied in the above molding operation may, if desired, be preceded by a preliminary compressing operation by which the lining material is formed under moderate pressure to the shape of the blank shown in Figs. 2 and 3. A similar brake lining blank may be produced and treated in the following manner by molding a suitable mass of brake lining compound of conventional composition to the shape of the blank shown in Figs. 1 and 2 and curing or baking it to less than its final state.

In Fig. 5 I have shown one method of finally contouring and curing the brake lining. A mold, generally designated by the numeral 28, is provided with cooperating male and female portions 29 and 30. The female portion 30 is provided with a concave recess 31 which engages the upper surface of the lining material while the male portion 29 is provided with a convex forming surface 32 which engages the lower surface of the lining material 19'. The surfaces 31 and 32 are so designed that the former in cross section is generated about a first center portion such as center B in Fig. 1 and the latter in cross section is generated about a cross section such as center A in Fig. 1 so that the resulting form of the brake lining will be that of the brake lining shown in Fig. 1. In the mold 28 the brake lining material 19' is uniformly compressed and heated until it is finally cured, the heat being supplied in the passages 33 by conventional means such as heating medium or electric coils.

Figure 6:
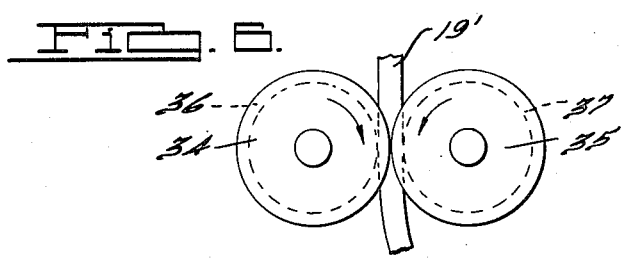
Fig. 6 is an elevational view of a pair of cooperating rollers illustrating an alternate method of finally contouring my improved lining.

In Fig. 6 I have shown an alternate method of forming a brake lining material to its final contour. In this figure, the numerals 34 and 35 represent cooperating rollers having annular grooves 36 and 37 therein respectively. The rollers are each powered by means not shown so that one roller rotates faster than the other roller thereby imparting an arcuate contour of predetermined configuration to the brake lining material 19' which is forced between the two rollers and is engaged within the grooves 36 and 37. The configuration of the lining may be predetermined by adjusting the relative speeds of the rollers 36 and 37. After the brake lining material has been formed to its final contour by the rollers shown in Fig. 6, it may be placed in an oven (not shown) and finally cured.

Figure 7:
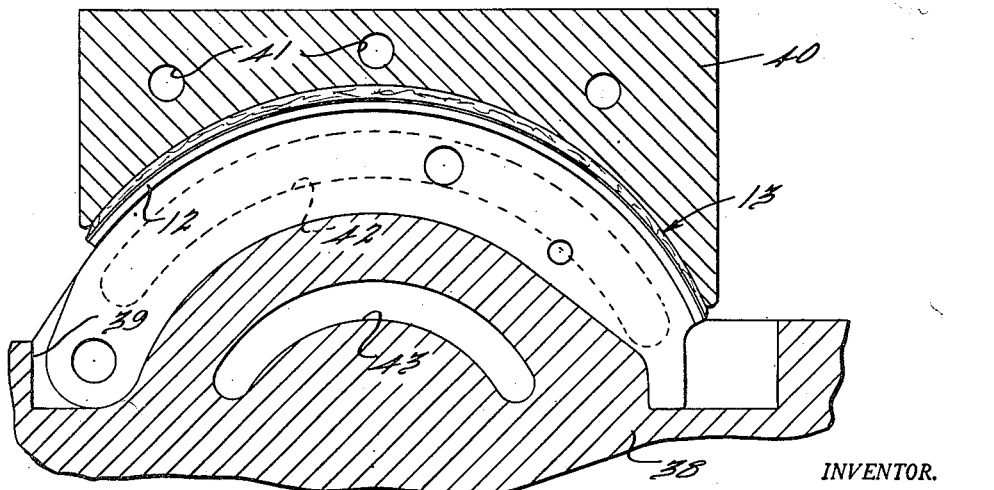
Fig. 7 is a sectional view of a heated mold showing mechanism for bonding the brake lining to a brake shoe.

In Fig. 7 I have shown a device for bonding the brake lining material 19' which after the operations heretofore set forth bonds the brake lining 13, as shown in Fig. 1, to the brake shoe under heat and pressure. This structure includes a male heating member 38 having an arcuate slot 39 disposed therein for receiving the web portion 11 of the brake shoe 10. The device also includes a female heating portion 40 which is disposed over the brake lining 13 and is provided with heating passages 41 for supplying heat to the member 40. In this manner the heat is applied to the brake lining 13 to thereby bond it to the rim 12 of the brake shoe. Suitable cement or other adhesive type of material, preferably of a thermosetting nature, is disposed between the rim and the brake lining to accomplish this bonding action. The male member 38 is also provided with heating passages 42 and 43 for applying heat to the rim 12 in order to expedite the bonding operation.

In accordance with my invention my improved brake lining may be utilized with a great many conventional motor vehicles and also may be readily applied as a replacement where conventional brake linings have worn out. While I have illustrated and described but one embodiment of my invention, it is to be understood that such is for the purpose of illustration only, and it is contemplated that those skilled in the art may modify certain details without departing from the spirit or scope of the invention as defined in the claims appended hereto.

I claim:

1. A brake lining and shoe assembly of the type described including a brake shoe having an arcuate rim portion, and an arcuate brake lining secured to said rim portion, the concave surface of said lining and convex surface of the rim of said shoe having their longitudinal cross sections substantially conforming to a segment of a circle generated about a first center and the convex surface of said lining having its longitudinal cross section substantially conforming to a segment of a circle generated about a second center disposed between said first center and said assembly, the density of said strip varying progressively from a minimum density at the central portions thereof to a maximum density at the opposite end portions of said strip.

2. A brake lining for a brake shoe comprising an arcuately formed strip of homogeneous friction material that is of substantially crescent-shaped side elevational configuration including a relatively thick centrally disposed, longitudinally extending, portion and relatively thin outwardly tapering, longitudinally extending end portions wherein the density of the lining material varies progressively from a minimum density in the centrally disposed portion to a maximum density in the tapering end portions.

3. A brake lining for a brake shoe comprising an arcuately shaped strip of friction material having concave and convex opposed surfaces with the concave surface of said lining strip formed as a segment of a first circle generated about a first center and the convex surface of said lining strip having its longitudinal cross section substantially conforming to a segment of a second circle of substantially the same radius that is generated about a second center disposed between said first center and said strip, the density of said lining strip varying progressively from a minimum density at the central portions thereof to a maximum density at the opposite end portions of said strip.

4. A brake lining for a brake shoe comprising a strip of homogeneous friction material wherein the thickness of the strip is a maximum in the portions of the strip located centrally of its length and progressively reduces in thickness towards the ends of said strip, the density of said strip being substantially inversely proportional to the thickness.

References Cited in the file of this patent

UNITED STATES PATENTS

| Number | Name | Date |
|---|---|---|
| 1,572,301 | Mead | Feb. 9, 1926 |
| 1,672,486 | Ewing | June 5, 1928 |
| 1,805,501 | Tatter | May 19, 1931 |
| 1,919,542 | Dick | July 25, 1933 |
| 1,930,779 | Snell | Oct. 17, 1933 |
| 2,067,086 | Hoffman | Jan. 5, 1937 |
| 2,135,126 | Harwood | Nov. 1, 1938 |
| 2,201,191 | Mathews | May 21, 1940 |
| 2,355,419 | Bruce | Aug. 8, 1944 |
| 2,418,719 | Mann | Apr. 8, 1947 |
| 2,476,588 | Dreher | July 19, 1949 |
| 2,495,045 | Woodbury et al. | Jan. 17, 1950 |

FOREIGN PATENTS

| Number | Country | Date |
|---|---|---|
| 610,902 | France | Sept. 16, 1926 |
| 176,786 | Great Britain | Dec. 21, 1922 |